No. 25,091. J. CALEF. PATENTED AUG. 16, 1859.
CONSTRUCTION OF CARRIAGES.
2 SHEETS—SHEET 1.
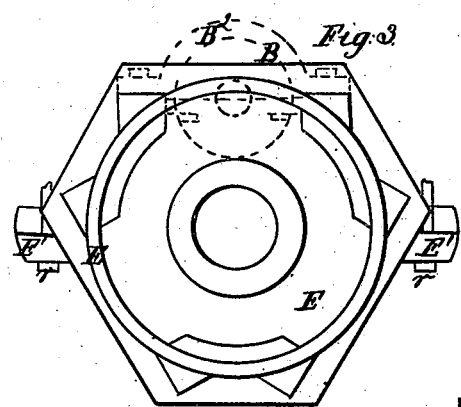
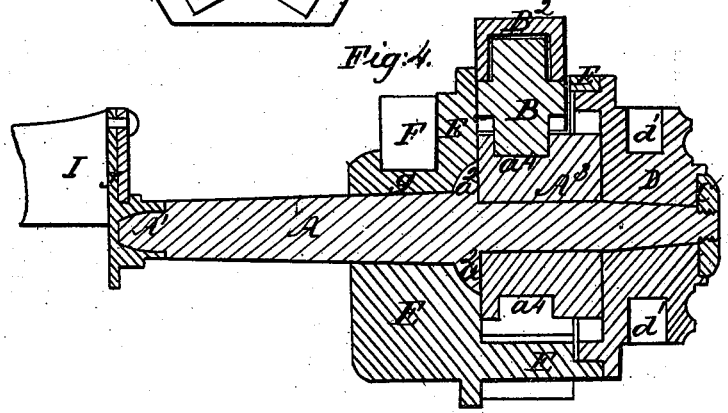
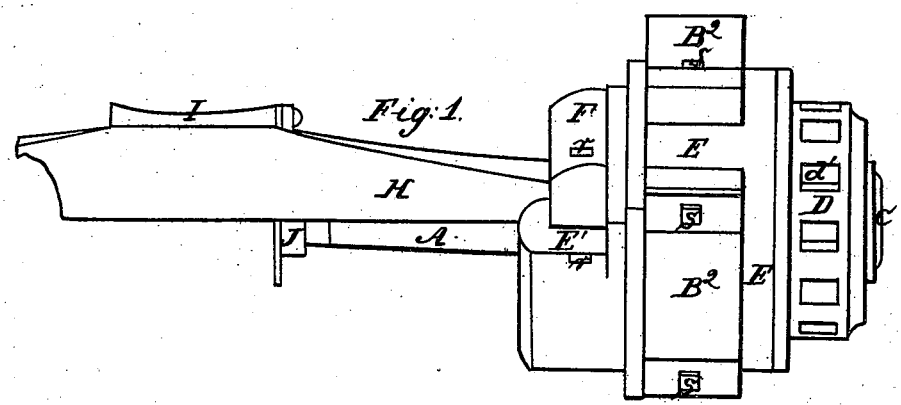
Witnesses:
W. H. Forbush
E. B. Forbush
Inventor:
Joseph Calef No. 25,091.          PATENTED AUG. 16, 1859.
J. CALEF.
CONSTRUCTION OF CARRIAGES.
2 SHEETS—SHEET 2.
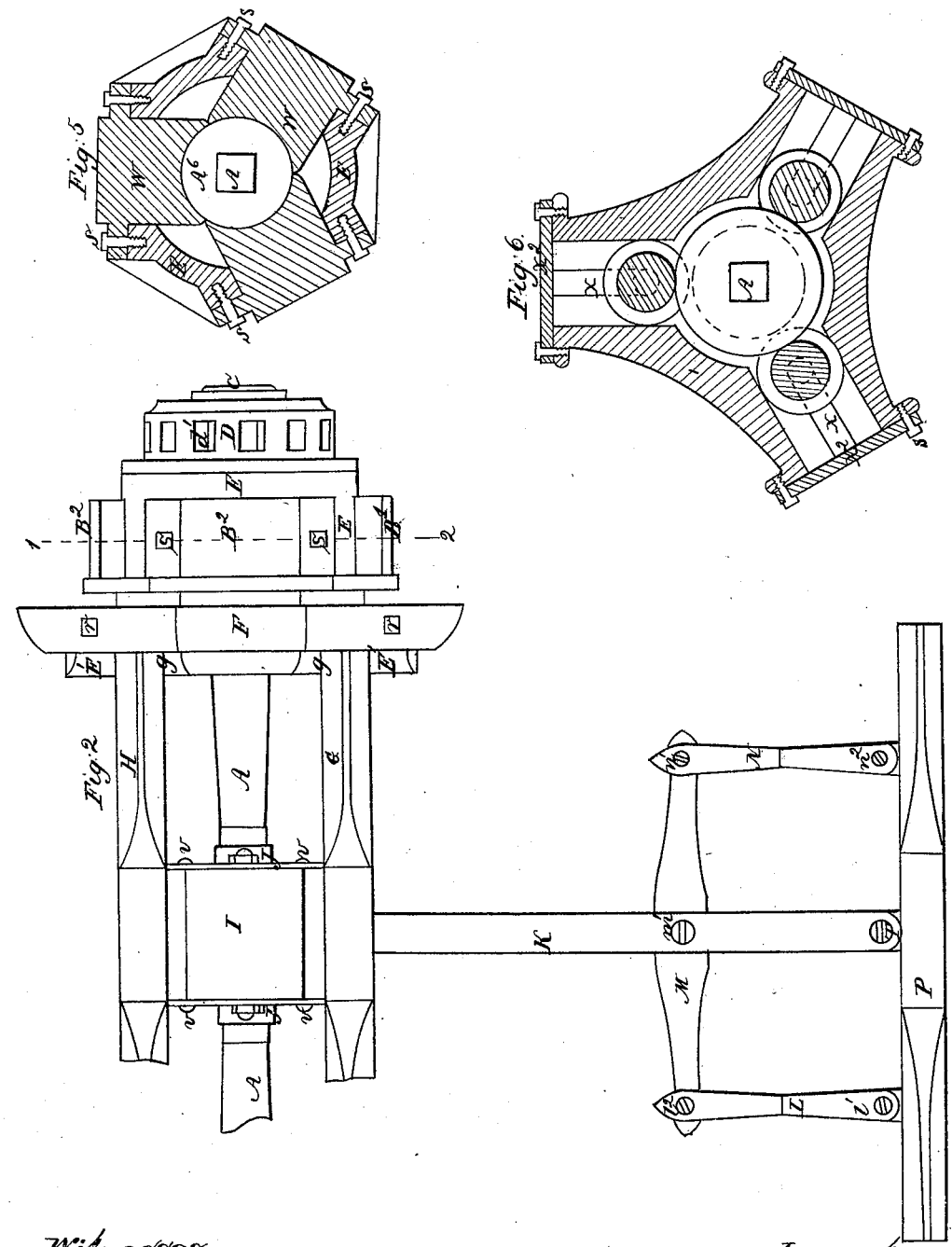
Witnesses;
W. H. Fybush
E. B. Forbush
Inventor;
Joseph Calef

UNITED STATES PATENT OFFICE.

JOSEPH CALEF, OF BUFFALO, NEW YORK.

RUNNING-GEAR OF CARRIAGES.

Specification of Letters Patent No. 25,091, dated August 16, 1859.

*To all whom it may concern:*

Be it known that I, JOSEPH CALEF, of the city of Buffalo, in the State of New York, have invented certain new and useful Improvements in the Construction of Wheel-Carriages, which improvements relate more particularly to the running-gear thereof; and I do hereby declare that the following is a full and exact description thereof, reference being had to the accompanying drawings and the letters of reference marked thereon.

The main purposes of my invention are increased strength and durability; reduced friction, and consequently, easy and steady movement of the carriage; in the arrangement of jointed arms or braces in connection with the forward gear as herein described.

To enable others skilled in the art to make and use my invention I will proceed to describe the construction and operation of the same.

Figure I is an elevation of my improved axle, journal box and hub. Fig. II is a plan of the same as arranged and combined together. Fig. III is an elevation of my improved journal box. Fig IV is a longitudinal section of axle, journal box, and hub. Fig. V is a section on line 1—2 Fig. II. Fig. VI is a section, similar to Fig. V, and shows a modified form of journal box.

A, represents a revolving axle, which may be made either of cast or wrought iron. The inner end is made tapering and is fitted to run in a journal box (J) as shown at A', Fig. IV. The outer end has a screw cut thereon, with a nut ($c$) to hold on the wheel. A shoulder is formed on the axle as shown at ($a^2$). A socket corresponding to this shoulder is made in the journal box. A heavy collar is also formed on the axle, upon which is made a journal bearing of large diameter. This journal is so formed upon the collar ($A^3$) as to make a depression or groove as shown at ($a^4$) in which groove the friction roller (B) works. The friction rollers (B) form a bearing for the axle and securely hold it in place. The axle cannot be removed or taken from its place, without first removing the rollers. The end of the axle which enters the hub, may be made square when the nut ($c$) is used, or it may be made round, and a screw cut thereon, and screw into the hub in the manner of right and left screws, in which case the hub forms the nut and the nut ($c$) is dispensed with. This construction and arrangement of the axle gives a comparatively long axle, having a great lever purchase and two bearings, to hold the wheel steady and prevent it from twisting. It also insures a remarkably easy, steady and quiet movement.

D, represents a cast iron hub which fits on to the end of the axle in a manner so as not to turn thereon as above described.

At $d^1$ is represented mortises for the reception of the spokes of the wheel. The wheel may be put on and taken off, without removing the axle from its place.

E, represents my improved journal box in which the axle revolves. It is of peculiar construction. Fig. III shows an elevation of the same looking upon the inside thereof. The dotted lines (B) show the position of the friction roller in the journal box. The friction roller is supported in an appropriate cap piece ($B^2$) and passes through an opening in the journal box so that the roller will drop into the groove ($a^4$) Fig. 4. There are three of these rollers to each wheel. The caps ($B^2$) are held to the journal box by means of the bolts ($s$). The projections $E^1$ are for the purpose of making a strong connection of the journal box to the frame work as shown in Fig. II. The bolts ($r$) pass through this projection and through the cross timber (F). The journal box has notches into which the timbers G, H, fit as shown at ($g$) so that it is held very securely to the frame work. The axle rests wholly upon the friction rollers within the journal box, and does not bear upon the box, inside of the rollers.

W, Fig. V, represents a journal slide which may be used as a substitute for the friction rollers if preferred. Its purpose is the same and it is held in the journal box in a similar manner to the friction rollers.

At X, Fig. VI, is shown friction rollers supported on arms $X^1$ which drop down from the cap piece $X^2$. This arrangement is adapted to the style of journal box shown in Fig. VI. It is a modified arrangement of the same principle shown in section in Fig. IV.

The frame work which supports the axle and journal box for each wheel is represented by the timbers F, G, H, I. The springs upon which the body of the carriage rests, are fastened to the block or timber I. The journal box (J) in which the inner end of the axle works is also supported on this timber as shown by the bolts (r). The timbers G, H are extended from the other side of the block I, with a similar cross timber F. These together form the frame work for the support of the hind wheels. A similar frame work shown in part at P supports the forward wheels. K, represents the reach which connects the two together. It is jointed to the forward frame work as shown at T.

L, M, N, represent arms or braces jointed at $l^1$ and $l^2$ and $n^1$ $n^2$ and $m^1$, having parallel movements. This arrangement gives great strength and pliability to the forward gear. It also dispenses with the use of a "king bolt" and distributes the draft in a way to secure the greatest possible strength of the material used.

This improvement is applicable to carriages using ordinary "axletrees."

Letters of like name and kind refer to like parts in each of the figures.

In running locomtives and rail road cars, it is a desideratum to make the motion of each wheel independent of the other, especially so, in turning curves. I intend to apply the principle of my improvement to these purposes.

What I claim as my invention and desire to secure by Letters Patent is—

1. The journal box E, constructed substantially as described and combined with the friction rollers B, (or slides W) for the purposes set forth.

2. The combination of the axle A, journal box E, friction rollers (B, and equivalents) and hub D, for the purposes set forth.

3. The arrangement of the jointed braces L, M, N, in combination with the running gear of carriages for the purposes set forth.

JOSEPH CALEF.

Witnesses:
W. H. FORBUSH,
E. B. FORBUSH.